US005465825A

United States Patent [19]

Levaro et al.

[11] Patent Number: 5,465,825

[45] Date of Patent: Nov. 14, 1995

[54] MAIL FLOW COMPENSATING DEVICE

[75] Inventors: Mauro Levaro, Genoa; Giuseppe Sofia, Genova Sestri Ponente, both of Italy

[73] Assignee: Finmeccanica S.p.A., Rome, Italy

[21] Appl. No.: 157,265

[22] Filed: Nov. 26, 1993

[30] Foreign Application Priority Data

Nov. 27, 1992 [IT] Italy ................................ TO92A0966

[51] Int. Cl.$^6$ .................................................... B65G 43/00

[52] U.S. Cl. ....................... 198/444; 198/502.2; 271/151; 271/167

[58] Field of Search .................................... 198/444, 453, 198/464.4, 462, 635, 633, 502.2, 572, 573; 271/215, 216, 199, 258, 259, 265, 151

[56] References Cited

U.S. PATENT DOCUMENTS

| | | | |
|---|---|---|---|
| 2,133,260 | 10/1938 | Wolff | 271/216 X |
| 2,133,263 | 10/1938 | Wolff | 271/216 X |
| 2,312,216 | 2/1943 | Keeler | 198/502.2 |
| 2,395,089 | 2/1946 | Arelt | 198/633 |
| 2,593,610 | 4/1952 | Roberts | 198/633 |
| 2,772,717 | 12/1956 | Ware, Jr. | 198/444 X |
| 3,126,201 | 3/1964 | Rehm . | |
| 3,227,263 | 1/1966 | Kastenbein | 198/572 |
| 3,236,355 | 2/1966 | Barnard et al. . | |
| 3,545,595 | 12/1970 | Reist | 198/572 |
| 4,010,857 | 3/1977 | Reim et al. | 198/502.2 X |
| 4,037,712 | 7/1977 | Wochnowski | 198/572 X |
| 4,046,369 | 9/1977 | Kluge et al. | 271/151 X |
| 4,108,301 | 8/1978 | Trozzi | 198/633 |
| 4,279,338 | 7/1981 | Sekora | 198/633 X |
| 4,355,799 | 10/1982 | Bartizal, Jr. | 271/151 |
| 4,551,040 | 11/1985 | Kasparek et al. | 198/444 X |
| 4,666,140 | 5/1987 | Godlewski | 271/151 X |
| 4,718,538 | 1/1988 | Löw et al. | 198/462 X |
| 4,755,093 | 7/1988 | Francioni . | |
| 4,805,890 | 2/1989 | Martin | 271/216 X |
| 4,962,844 | 10/1990 | Francioni | 198/462 X |
| 4,973,039 | 11/1990 | Jeske et al. | 271/151 |
| 5,054,604 | 10/1991 | Horsley et al. | 198/444 |
| 5,150,891 | 9/1992 | Svyatsky et al. | 271/151 X |
| 5,255,905 | 10/1993 | Reid et al. | 271/167 X |

FOREIGN PATENT DOCUMENTS

| | | | |
|---|---|---|---|
| 1350350 | 4/1964 | France . | |
| 1267012 | 4/1968 | Germany . | |
| 1202108 | 8/1970 | United Kingdom | 198/502.2 |

*Primary Examiner*—D. Glenn Dayoan
*Attorney, Agent, or Firm*—Shlesinger Arkwright & Garvey

[57] ABSTRACT

A mail flow compensating device which is a straight horizontal conveyor belt and is supplied with a stream of overlapping flat mail items. The flow compensating device is made of a stop wall sloping in relation to the belt and presenting a bottom end portion facing the belt. When the height of the stream exceeds a maximum value, the mail items contact and accumulate against the stop wall to form a group of superimposed mail items. The flow compensating device also presents an optical sensor for detecting the limit contour of the group of mail items, generating a full-flow-compensating-device signal, and cutting off supply to the conveyor belt.

18 Claims, 1 Drawing Sheet

MAIL FLOW COMPENSATING DEVICE

BACKGROUND OF THE INVENTION

The present invention relates to a mail flow compensating device.

Mail sorting machines are known wherein a flow forming device provides for forming a stream of overlapping mail items (letters and postcards), which is fed by a conveyor belt to a user, e.g. separating, device.

Under stationary operating conditions, the output of the flow forming device substantially equals the input of the separating device, so that the stream of mail items is substantially orderly.

When the number of mail items fed to the output of the flow forming device, however, is greater than that withdrawn by the separating device, the mail items are subjected to forces affecting the initial arrangement. More specifically, the bottom portion of the mail items moves at substantially the same speed as the conveyor belt, whereas the items themselves are subjected to the reaction exerted by the items accumulating at the input of the separating device.

As a result, each mail items rotates about its bottom edge, and is lifted off the surface of the belt and on to the foregoing item closer to the separating device, so that the height of the stream gradually increases to such a point as to result in fallout of the mail items.

SUMMARY OF THE INVENTION

It is an object of the present invention to provide a flow compensating device fittable along a conveyor belt of the aforementioned type, and which provides for compensating for any difference between the output stream generated by the flow forming device and the input stream to the user device.

According to the present invention, there is provided a flow compensating device for mail items, characterized by the fact that it comprises:

a straight conveyor device driven by first drive means;

said conveyor device presenting an input supplied with a stream of overlapping flat mail items presenting a substantially constant height (H) under stationary supply conditions;

said conveyor device presenting an output for expelling said stream of mail items; and a stop wall located a predetermined distance (D) from said conveyor device and designed to intercept said mail items upon the height of said stream exceeding a maximum value.

BRIEF DESCRIPTION OF THE DRAWINGS

A preferred non-limiting embodiment of the present invention will be described by way of example with reference to the accompanying drawings, in which.

DETAILED DESCRIPTION OF THE INVENTION

Figure 1:
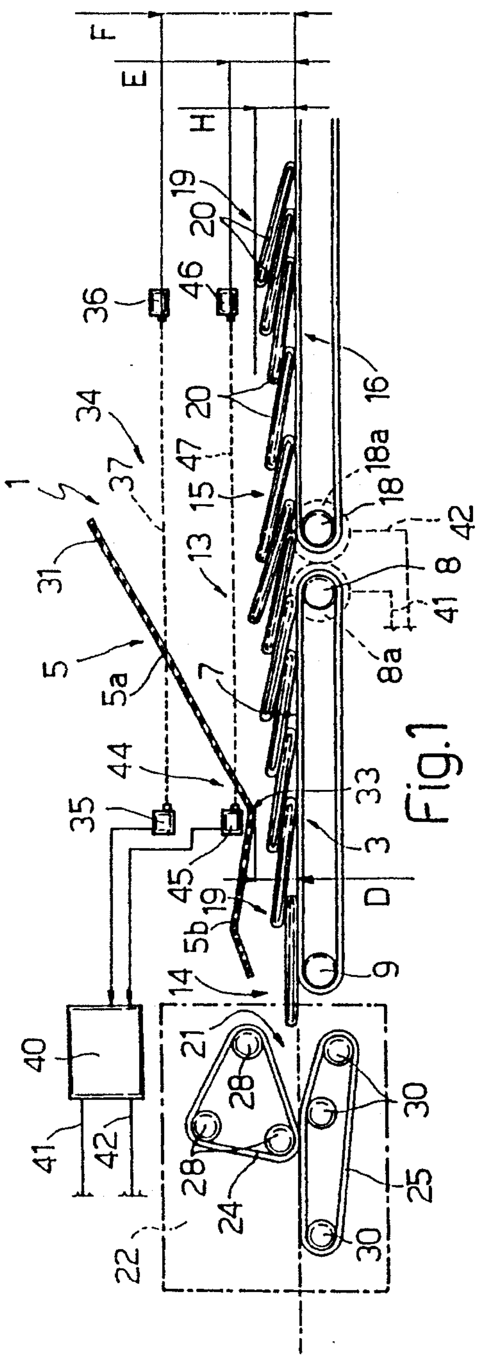
FIG. 1 shows a schematic side view of a flow compensating device in accordance with the teachings of the present invention.

Number 1 in FIG. 1 indicates a flow compensating device comprising a horizontal conveyor belt 3 and a shaped stop wall 5 located over belt 3. Conveyor belt 3 comprises a straight flat top portion 7 extending between two pulleys 8 and 9 and defining at each end the input 13 and output 14 of belt 3.

More specifically, input 13 communicates with the output 15 of a second horizontal conveyor belt 16 extending between an idle pulley (not shown) and a drive pulley 18 facing pulley 8. Belt 3 is driven from pulley 8 to pulley 9 by a direct-current motor **8*a* (shown schematically), while pulley 18 is driven by a motor 18*a***.

The second conveyor belt 16 is supplied by a postal machine (not shown), e.g. a flow forming device, which provides for forming on belt 16 a stream 19 of overlapping mail items 20 (letters and postcards).

Output 14 of belt 3 communicates with the input 21 of a conveyor device 22 forming part of a user device, e.g. a separating device (not shown), for receiving mail items 20 from belt 3. More specifically, conveyor device 22 comprises a top belt 24 having, when viewed from the side, a substantially triangular contour and supported on three pulleys 28 driven by an electric motor (not shown). Conveyor device 22 also comprises a substantially straight bottom belt 25 supported on three drive pulleys 30 and having a mid portion contacting a bottom portion of belt 24. The portions of belts 24 and 25 facing belt 3 define the input 21 of conveyor device 22.

Stop wall 5 comprises a first flat portion **5*a* sloping in relation to portion 7, converging with the traveling direction of belt 3, and extending between a top end 31 and a bottom end 33 blending with a second upward-bent portion 5*b*. Bottom end 33 of wall 5 is located facing belt 3, and is separated from portion 7** by distance D.

Wall 5 is made of transparent material (e.g. plexiglass) and is connected to an optical sensor 34 comprising a photoemitting device 35 and photodetecting device 36 defining an optical path 37 which intersects wall 5 and extends parallel to and at a distance F from flat portion 7.

Optical sensor 34 is connected to a central processing unit 40 (shown schematically) and provides for generating a full-flow-compensating-device signal when optical path 37 is cut off.

Flow compensating device 1 also presents a second optical sensor 44 comprising a photoemitting device 45 and photodetecting device 46 defining an optical path 47 parallel to path 37 and separated from flat portion 7 by a distance E less than distance F.

Optical sensor 44 is connected to central processing unit 40 (shown schematically) and provides for generating an empty-flow-compensating-device signal when optical path 47 is not cut off.

By means of respective lines 41 and 42, processing unit 40 controls motors **8*a* and 18*a* driving conveyor belts 3 and 16**.

In actual use, and under stationary operating conditions, the mail items 20 fed by the flow forming device (not shown) on to conveyor belt 16 substantially equal those fed by belt 3 to the separating device (not shown), so that stream 19 extends from the flow forming device (not shown) to input 21, and presents a substantially constant geometric characteristics by virtue of items 20 overlapping one another and forming an angle of a few degrees with the surface of belt 16.

More specifically, height H of stream 19 is less than distance D, so that stream 19 is fed by belts 16 and 3 underneath wall 5.

Conversely, in the event the supply of items 20 on to conveyor belt 16 by the flow forming device (not shown) is greater than that to input 21 of the separating device (not shown), stream 19 is subjected to forces affecting its initial arrangement.

In this case, in fact, the bottom portion of items 20 travels at substantially the same speed as belts 3 and 16, while items 20 themselves are subjected to the reaction exerted by the items 20 accumulating against input 21.

Figure 2:
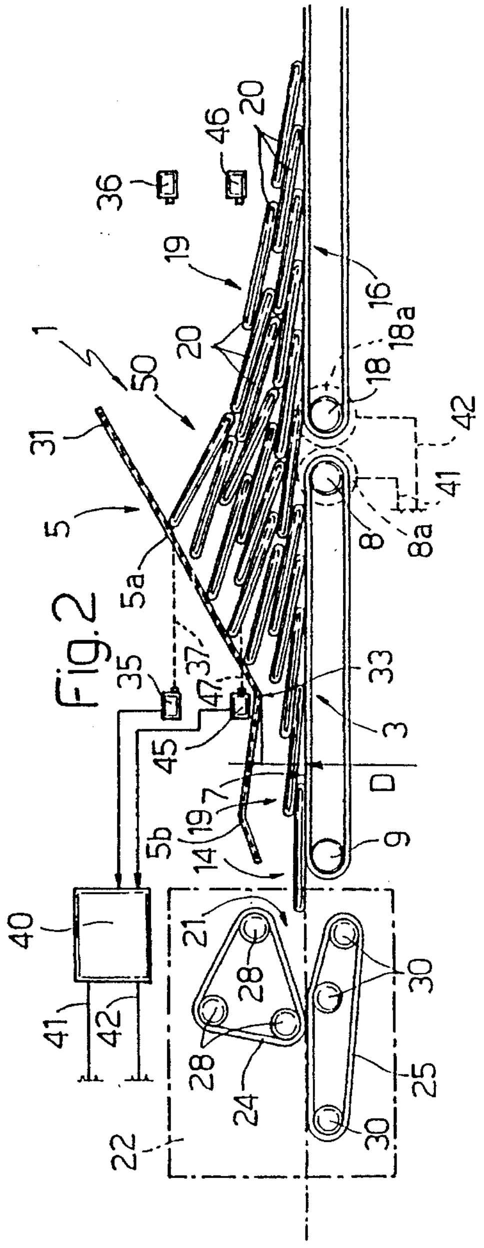
FIG. 2 shows the FIG. 1 flow compensating device in a different operating condition.

As a result, each item 20 rotates about its bottom edge and is lifted off the surface of belts 16 and 3 and on to the .foregoing item 20 closer to input 21, so that the height of stream 19 increases. When the height of stream 19 exceeds distance D, items 20 contact wall 5 (FIG. 2) and pile up one on top of the other into a group 50.

The height of group 50 increases gradually until an item 20 in the group eventually intercepts optical path 37, at which point, central processing unit 40 stops conveyor belt 16; conveyor belt 3 transfers the items 20 accumulated in device 1 to conveyor device 22; and flow compensating device 1 thus disposes of the accumulated items 20 so that the height of group 50 gradually decreases.

Upon the height of group 50 falling below optical path 47 (indicating device 1 is substantially empty), belt 16 is started up again, and stream 19 transferred continuously by the flow forming device (not shown) to the separating device (not shown).

Flow compensating device 1 thus clearly provides for compensating for any difference between the output of the flow forming device and the input to the user device.

By means of repeated start and stop cycles of belt 16, flow compensating device 1 provides for ensuring the stream of mail items supplied to input 21 of the separating device (not shown) is substantially constant and not noticeably distorted.

To those skilled in the art it will be clear that changes may be made to the flow compensating device as described and illustrated herein without, however, departing from the scope of the present invention.

For example, the functions of the second sensor 44 may be performed by a timing circuit (not shown) of processing unit 40, designed to receive the full-flow-compensating-device signal generated by sensor 34, and, following stoppage of belt 16, to re-start belt 16 after a given time interval T (sufficient for unloading flow compensating device 1).

We claim:

1. A flow compensating device for mail articles, comprising:

a) a first conveyor;

b) a first drive means for driving said first conveyor;

c) said first conveyor including an input end for receiving a stream of articles, said stream providing a substantially constant height under normal supply conditions;

d) said first conveyor including an output end for discharging the articles at a substantially constant speed;

e) means operably associated with said first conveyor for intercepting the articles when the height of said stream exceeds a predetermined value so that the articles are discharged by said output end at said substantially constant speed;

f) said intercepting means remaining stationary relative to said first conveyor;

g) said intercepting means comprises a stop wall;

h) said stop wall slopes downwardly relative to said first conveyor in the moving direction of said first conveyor;

i) said stop wall includes an end portion facing said first conveyor;

j) means for supplying a stream of articles to said first conveyor; and k) first sensor means for detecting the presence of any articles accumulated against said stop wall and emitting a signal for stopping said supply means.

2. The device as recited in claim 1, wherein:

a) said first conveyor includes at least one conveyor belt having at least one generally straight flat portion;

b) said stop wall slopes relative to said flat portion; and c) said end portion is vertically spaced from said flat portion by a predetermined distance.

3. The device as recited in claim 1, and including:

a) a second sensor means for detecting the absence of articles against said stop wall and emitting a signal for restarting said supply means.

4. The device as recited in claim 3, wherein:

a) said first sensor means comprises a first optoelectronic sensor defining a first optical path for intercepting an article.

5. The device as recited in claim 4, wherein:

a) said second sensor means comprises a second optoelectronic sensor defining a second optical path for intercepting an article.

6. A device as recited in claim 5, wherein:

a) said stop wall is substantially transparent and is positioned to intersect said first and second optical paths.

7. A device as recited in claim 3, and including:

a) said means for supplying a stream of articles to said first conveyor comprising a second conveyor;

b) a second drive means for driving said second conveyor;

c) said second conveyor including an output end positioned adjacent said input end of said first conveyor; and d) said output end of second conveyor operably connected with said input end of said first conveyor for supplying articles.

8. The device as recited in claim 7, and including:

a) an electronic control unit communicating with said first sensor means and said second drive means; and b) said control unit stopping said second drive means upon receiving said signal from said first sensor means.

9. A device as recited in claim 7, and including:

a) an electronic control unit communicating with said second sensor means; and b) said control unit restarting said second drive means upon receiving said signal from said second sensor means.

10. A flow compensating device for mail articles, comprising:

a) a first conveyor;

b) first drive means for driving said first conveyor;

c) said first conveyor including an input end for receiving a stream of overlapping generally flat articles, said stream presenting a substantially constant height under normal supply conditions;

d) said first conveyor including an output end for expelling the articles;

e) a stop wall positioned a predetermined distance from said first conveyor for intercepting the articles when the height of said stream exceeds a predetermined value;

f) means for supplying articles to said first conveyor;

g) first sensor means for detecting the presence of any articles accumulated against said stop wall and emitting a signal for stopping said supply means;

h) said first sensor means comprising a first optoelectronic sensor defining a first optical path for intercepting an article;

i) second sensor means for detecting the absence of articles against said stop wall and emitting a signal for restarting said supply means; and j) said second sensor means comprising a second optoelectronic sensor defining a second optical path for intercepting an article.

11. A flow compensating device for mail articles, comprising:

a) a first conveyor;

b) first drive means for driving said first conveyor;

c) said first conveyor including an input end for receiving a stream of partially overlapping generally flat articles, said stream presenting a substantially constant height under normal supply conditions;

d) a second conveyor for supplying the articles to said first conveyor;

e) second drive means for driving said second conveyor;

f) said second conveyor including an output end positioned adjacent said input end of said first conveyor;

g) said first conveyor including an output end for expelling the articles towards a handling unit positioned adjacent thereto;

h) a stop wall positioned a predetermined distance from said first conveyor for intercepting the articles when the height of said stream exceeds a predetermined value;

i) first sensor means for detecting a first profile of articles accumulated against said stop wall and emitting a signal for stopping said second drive means for thereby cutting-off supply of articles to said first conveyor.

12. The device as recited in claim 11, wherein:

a) said stop wall slopes downwardly relative to said first conveyor in the moving direction of said first conveyor; and b) said stop wall includes an end portion facing said first conveyor.

13. The device as recited in claim 11, wherein:

a) said first conveyor includes at least one conveyor belt having at least one generally flat portion;

b) said stop wall slopes relative to said flat portion; and, c) said end portion is vertically spaced from said flat portion by said predetermined distance.

14. The device as recited in claim 11, and including:

a) second sensor means for detecting a second profile of articles accumulated against said stop wall and emitting a signal for restarting said second drive means.

15. The device as recited in claim 14, wherein:

a) said first sensor means comprises a first optoelectronic sensor defining a first optical path for intercepting an article.

16. A device as recited in claim 15, wherein:

a) said second sensor means comprises a second optoelectronic sensor defining a second optical path for intercepting an article.

17. A device as recited in claim 11, and including:

a) an electronic control unit communicating with said first sensor means and said second drive means; and b) said control unit stopping said second drive means upon receiving said signal from said first sensor means.

18. A device as recited in claim 14, and including:

a) an electronic control unit communicating with said second sensor means; and, b) said control unit restarting said second drive means upon receiving said signal from said second sensor means.

* * * * *